INVENTOR
JOHN KEITH SIMPSON
BY
Cecil F. Arens

Patented Sept. 24, 1946

2,408,003

UNITED STATES PATENT OFFICE 2,408,003

LIQUID PRESSURE REMOTE CONTROL SYSTEM

John Keith Simpson, Leamington Spa, England, assignor to Automotive Products Company Limited, Leamington Spa, England Application January 3, 1944, Serial No. 516,863
In Great Britain November 12, 1942

16 Claims. (Cl. 60—54.5)

This invention relates to liquid pressure remote control systems, and more specifically to that type of remote control system in which a transmitter piston is movable in a cylinder to eject liquid from the cylinder through a pipeline into a motor cylinder and so to produce corresponding movement of a piston in the motor cylinder.

The primary object of the invention is to provide an improved means for periodically correcting the phase relation of the transmitter and motor pistons, in order to compensate for expansion and contraction of the liquid due to temperature variations, and for leakage from the system. Another object is to provide transmitter and motor units each constituting elements of two separate remote control systems, operable together or separately to produce different movements of a controlled element.

According to one aspect of the invention, in a liquid pressure remote control system of the type referred to, the movement of the transmitter piston to at least one end of the transmitter cylinder opens a valve connecting that end of the transmitter cylinder to a source of liquid under pressure, whereby the stroke of the motor piston, if, due to leakage or other causes it has not been completed by the movement of the transmitter piston, is completed by liquid from the said source.

According to another aspect of the invention, a liquid pressure remote control system of the type referred to, comprises a transmitter cylinder, a motor cylinder, pistons in the said cylinders, means for producing movement of the transmitter piston in the transmitter cylinder, and a valve device operated by the movement-producing means when the transmitter piston reaches at least one end of its stroke, to connect the motor cylinder to a source of liquid under pressure in such a way that the pressure from the said source tends to move the motor piston in the same direction as it has been moved by the liquid from the transmitter cylinder during the stroke of the latter just completed.

A double acting liquid pressure remote control system of the type referred to may comprise a transmitter cylinder, a motor cylinder, pistons in the cylinders, and two pipe-lines each connecting one end of the transmitter cylinder to one end of the motor cylinder, the movement of the transmitter piston to either end of the transmitter cylinder actuating a valve to connect that end of the transmitter cylinder to a source of liquid under pressure and to connect the other end of the transmitter cylinder to a drain or reservoir, whereby the liquid from said source tends to move the motor piston in the same direction as it has been moved by liquid from the transmitter cylinder during the stroke of the latter just completed.

In a liquid pressure remote control system according to the last preceding paragraph, the effective area of each end of the transmitter piston may be equal to the effective area of that end of the motor piston upon which liquid ejected from the transmitter cylinder by that end of the transmitter piston acts, the total stroke of the transmitter piston being greater than the stroke of the motor piston, and that part of the stroke of the transmitter piston during which neither end of the transmitter cylinder is connected to the source of liquid under pressure being equal to the stroke of the motor piston.

In a liquid pressure remote control system of the type referred to having the motor piston movable in one direction by liquid pressure and in the other direction by a spring, valve means may be provided to connect the liquid-containing part of the system to a source of liquid under pressure when the transmitter piston is at the end of the stroke during which it transfers liquid to the motor cylinder, and to connect the said part of the system to a reservoir or drain when the transmitter piston is at the other end of its stroke.

According to a further aspect of the invention, in a liquid pressure remote control system of the type referred to, a piston reciprocable in a transmitter cylinder is hollow and itself forms a cylinder for a second piston reciprocable therein, the transmitter unit being connected by conduits to motor cylinders the pistons in which are operated by the inner and outer pistons of the transmitter unit respectively, and means being provided to move the transmitter pistons together or separately, to produce movement of one or other of the motor pistons relative to the cylinder in which it is mounted.

In a liquid pressure remote control system as set out in the last preceding paragraph, the motor cylinders may comprise a single unit similar to the transmitter, one piston being hollow to form the cylinder for the second piston.

A liquid pressure remote control system as set out in the two last preceding paragraphs may be combined with a pair of devices each mounted for reciprocatory or oscillatory movement in one plane upon an intermediate support itself mounted for reciprocatory or oscillatory movement in a plane perpendicular to the first, the hollow piston rods of the liquid pressure control system being connected to the intermediate supports, and the inner piston rods of the liquid pressure control system being connected to the devices themselves through bell-crank levers pivotally mounted at their elbows on the intermediate supports.

The invention is hereinafter described with reference to the accompanying drawings, in which.

Figure 1:
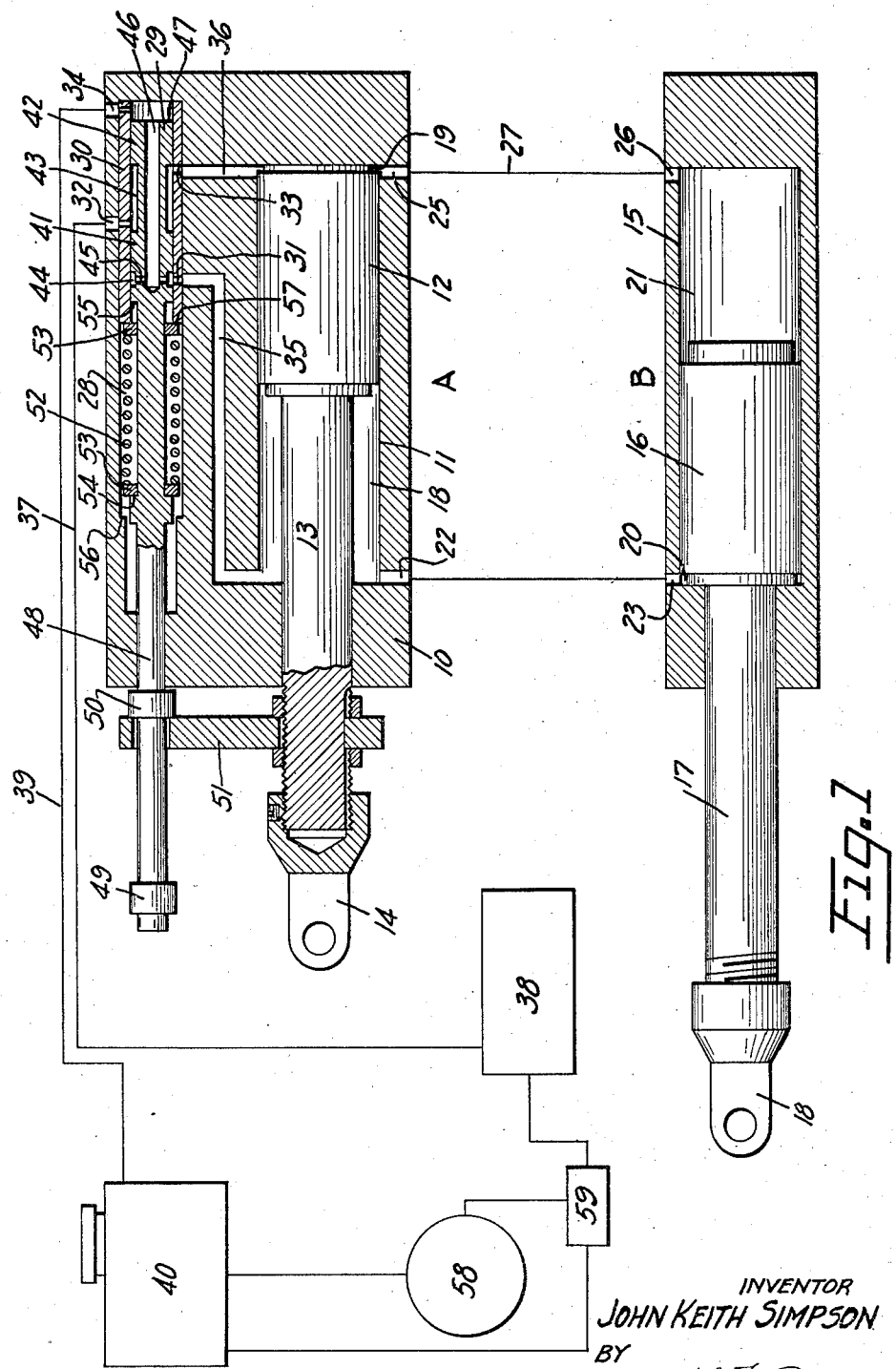
Figure 1 shows in diagrammatic form a two-pipe-line liquid pressure remote control system according to the invention.

Referring to Figure 1, the transmitter and motor units are shown at A and B respectively. The transmitter comprises a body 10 having a cylinder bore 11 therein to receive a piston 12, the piston rod 13 of which projects from the body 10 and carries a member 14 for connection to an operating lever or equivalent (not shown).

The motor unit comprises a cylinder 15 in which there is slidable a piston 16 having a rod 17 of the same diameter as the transmitter piston rod, to which is attached a member 18 for connection to the device to be operated.

The cylinder bore 11 in the transmitter unit, and the bore of the motor cylinder 15 are of the same diameter, and each is divided by its piston into two chambers, one of the full bore of the cylinder and the other of an effective area equal to the cylinder bore less the area of the piston rod. The two chambers in the transmitter cylinder are indicated by the references 18 and 19 respectively, 18 being the annular chamber, and the two chambers in the motor cylinder are indicated by the references 20 and 21 respectively, 20 being the annular chamber. Ports 22 and 23 leading to the chambers 18 and 20 respectively are connected by a pipe 24, and ports 25 and 26 leading to the chambers 19 and 21 respectively are connected by a pipe 27.

The transmitter body 10 also contains a bore 28 to accommodate a piston valve 29. The bore 28 is parallel to the cylinder bore 11, and has fixed therein at one end a sleeve 30 in which are four longitudinally spaced ports 31, 32, 33 and 34. The port 31 is connected by a passage 35 in the body 10 to the annular chamber 18 in the cylinder 11, and the port 33 is similarly connected by a passage 36 to the chamber 19. The intermediate port 32 is connected by a pipe 37 to a liquid pressure accumulator 38, and the fourth port 34 is connected by a pipe 39 to a liquid reservoir 40. The ports 31 and 33 are equidistant from the port 32. The piston valve 29 has two lands 41 and 42 of equal length separated by an annular recess 43, the land 41 being bounded on its opposite side by a second annular recess 44 connected by passages 45 and 46 to the end face 47 of the valve piston. From the end of the valve piston nearer the recess 44 there extends a rod 48 which projects from the body 10 and carries two stops 49 and 50, between which the rod passes freely through a hole in an arm 51 carried by and moving with the transmitter piston rod 13. Within the bore 28 the rod 48 is surrounded by a spring 52 extending between two washers 53, 53, the rod having abutments 54, 55 to be engaged by the washers and to limit the extension of the spring. A reduced portion of the bore 28 terminates in a shoulder 56 spaced from the end 57 of the sleeve 30 by a distance equal to the spacing of the abutments 54, 55, and the washers 53 project radially beyond the abutments 54, 55 to engage the shoulder 56 and the end 57 of the sleeve respectively. The valve piston 29 is thus biased to a central position by the spring, but can be moved in either direction from that position. The arrangement is such that with the valve piston 29 in the position to which it is moved by the spring, the ports 31 and 33 are covered by the lands 41 and 42 on the valve piston, movement of the piston in either direction bringing one or other of the ports 31 and 33 into communication with the recess 43 in the piston, so that that port is connected to the port 32 and to the accumulator 38, and simultaneously bringing the other port 31 or 33 into communication with either the recess 44 or the bore of the sleeve 30 beyond the end 47 of the valve piston, so that that port is connected to the port 34 and so to the reservoir 40.

The arrangement is such that as the transmitter piston 12 approaches either end of its stroke, the arm 51 engages the stop 49 or 50 and moves the valve piston from its central position to make the appropriate connections between the transmitter cylinder 11 and the accumulator 38 and reservoir 40, as described below. The total stroke of the transmitter piston 12 is greater than the total stroke of the receiver piston 16, the stroke of the latter piston being equal to the part of the stroke of the transmitter piston between the points at which the ports 31 and 33 commence to be opened by movement of the piston valve 29.

The accumulator 38 is supplied with liquid under pressure by a continuously driven pump 58 which draws liquid from the reservoir 40, a cutout valve 59 being provided to connect the pump to the accumulator when the pressure in the latter falls below a predetermined minimum, and to disconnect the pump from the accumulator and allow it to circulate liquid idly back to the reservoir when the pressure in the accumulator rises to a predetermined maximum.

The system above described is shown in Figure 1 with both pistons at one end of their strokes, so that the chambers 18 and 21 in the transmitter and receiver units respectively have their maximum volume, and the chambers 19 and 20 their minimum volume. The arm 51 is in engagement with the stop 50, and the piston valve is so positioned that the port 33 is connected to the port 32, and to the accumulator, whilst the port 31 is connected to the port 34, and to the reservoir. This is the condition which exists when the transmitter piston 12 has completed its stroke towards the right as shown on the drawings, and it will be evident that should there have been any leakage or contraction of the liquid in that part of the system comprising the chambers 19 and 21 and the pipe 27 which would result in the piston 16 lagging behind the piston 12, the stroke of the piston 16 would be completed by pressure from the accumulator after the piston valve 29 has moved to connect the ports 32 and 33, whilst any excess liquid in the part of the system comprising the chambers 18 and 20 and the pipe 24 would be ejected through the passage 35, and ports 31 and 34, to the reservoir. Movement of the transmitter piston to the opposite end of its stroke moves the valve piston 29 to connect the port 31 to the port 32, and the port 33 to the port 34, thus permitting liquid from the accumulator to enter the part of the system comprising chambers 18 and 20 and pipe 24, and connecting the part of the system comprising chambers 19 and 21 and pipe 27 to the reservoir, and so ensuring that the stroke of the motor piston in that direction is completed. So long as the transmitter piston moves in that part of its travel between the points where the valve 29 begins to open the ports 31 and 33, the system is completely closed.

Figure 2:
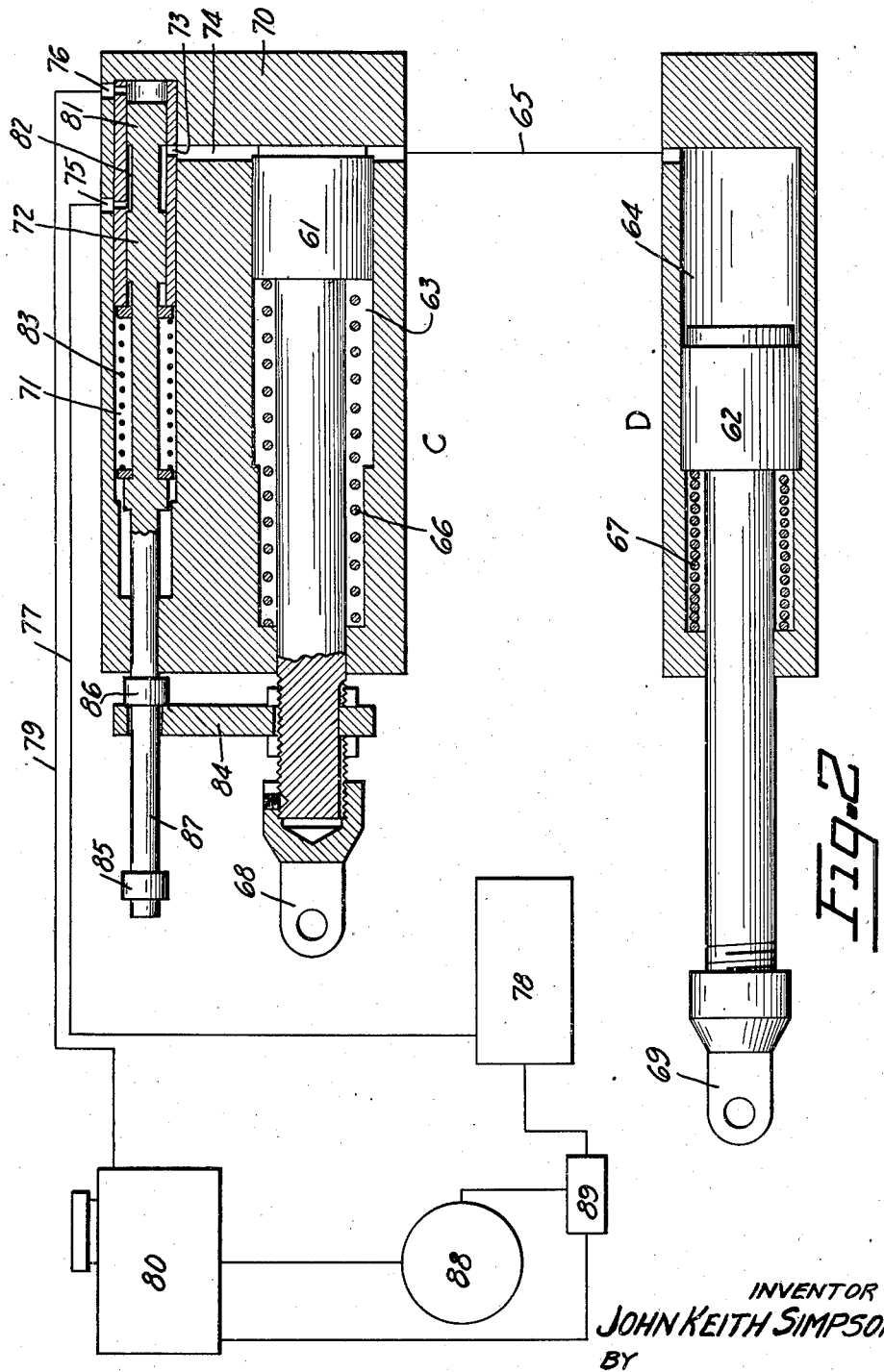
Figure 2 shows, also in diagrammatic form, a single-pipe-line liquid pressure remote control system according to the invention.

The system shown in Figure 2 is of the single-pipe-line type, the pistons 61 and 62 of the transmitter unit C and motor unit D respectively operating in cylinders 63 and 64 connected by a single pipe 65, and being held up against the liquid column in that pipe and the cylinders by springs 66 and 67. The piston rods are provided with coupling members 68 and 69 respectively for connection to an operating lever or equivalent, and to the device to be operated. The body 70 of the transmitter unit C is formed with a bore 71 for a piston valve 72 controlling the connection between a single port 73 connected by a passage 74 with the transmitter cylinder and either of two ports 75 and 76, the port 75 being connected by a pipe 77 to a liquid pressure accumulator 78 and the port 76 being connected by a pipe 79 to a liquid reservoir 80. A land 81 on the valve piston 72 separates an annular recess 82 in the valve piston from the end of the piston, the ports 75 and 76 being respectively in permanent communication with the recess 82 and the valve bore 71 beyond the end of the piston. The port 73 lies midway between the ports 75 and 76, being covered by the land 81 when the valve piston is in a central position. The valve piston is biassed to a central position by a spring 83 similar to the spring 52 of Figure 1, and is similarly displaced when the transmitter piston reaches either end of its stroke, by the engagement of an arm 84 carried by the rod of the transmitter piston with one of two stops 85 and 86 on the valve rod 87.

The pressure in the accumulator is maintained by a pump 88 and cut-out valve 89 as described in connection with Figure 1.

In the system just described, when the transmitter piston 61 is moved to the end of its stroke during which it forces liquid into the motor cylinder, the valve piston 72 is moved to a position in which it connects the ports 73 and 75, so that liquid from the accumulator 78 can enter the system, and complete the stroke of the motor piston 62 if, due to leakage or contraction of the liquid, this stroke has not been completed. The parts are then in the position shown in Figure 2. During the movement of the transmitter piston away from the position shown, the spring 67 causes the motor piston to follow up the movement of the transmitter piston. If there were an excess of liquid in the system, the motor piston 62 would not be able to complete this stroke, but the final movement of the transmitter piston 61 in this direction moves the valve piston 72 to connect the port 73 to the port 76, thus connecting the system to the reservoir 80, so that the spring 67 can force liquid out of the system to the reservoir, and complete the stroke of the piston 62.

As in the case of the system shown in Figure 1, the stroke of the motor piston 62 is shorter than the total stroke of the transmitter piston 61, the area of the pistons being equal, and the stroke of the motor piston is equal to the stroke of the transmitter piston between the points at which the valve commences to open the port 73.

Figure 3:
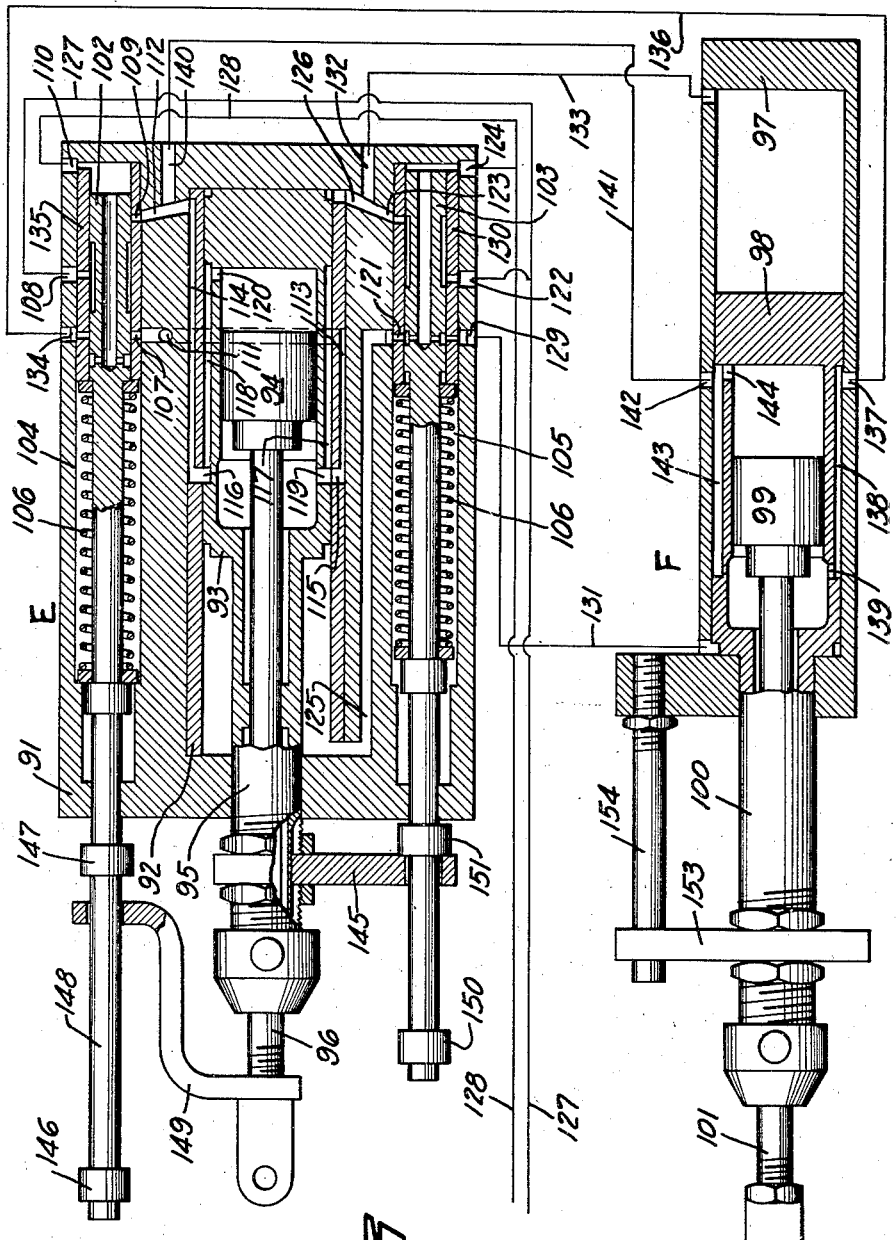
Figure 3 shows the transmitter and receiver units of a modified form of liquid pressure remote control system according to the invention.

Figure 3 shows what may be termed a dual remote control system, in which the transmitter unit and motor unit each include the elements of two separate systems. The transmitter unit is indicated by the reference E and the motor unit by the reference F. The transmitter unit comprises a body 91 in which is mounted a sleeve 92 forming the cylinder for a hollow piston 93 which itself forms the cylinder for a second piston 94 hereinafter referred to as the inner piston. From one end of the hollow piston 93 there extends a tubular piston rod 95, through which passes the rod 96 of the inner piston 94, the rod 96 being of sufficient length to project beyond the outer end of the hollow rod 95 whatever may be the position of the inner piston 94 in the hollow piston 93.

The motor unit comprises a cylinder 97 in which is slidably mounted a hollow piston 98 itself forming a cylinder for an inner piston 99. As in the transmitter unit, the hollow piston 98 has a tubular piston rod 100 through which extends the piston rod 101 of the inner piston 99.

Two piston valves 102 and 103 are arranged in bores 104 and 105 in the body 91, each valve being identical with the valve 29 shown in Figure 1, and having a similar centering spring 106. The piston valve 102 controls the connections between ports 107, 108, 109 and 110, the ports 107 and 109 being connected by passages 111 and 112 to longitudinal grooves 113 and 114 in the outer surface of the sleeve 92, the grooves being connected by ports 115 and 116 at the centre of the length of the sleeve to further longitudinal grooves 117 and 118 in the outer surface of the hollow piston, from which grooves ports 119 and 120 lead respectively into opposite ends of the hollow piston. The piston valve 103 controls the connections between ports 121, 122, 123 and 124, the ports 121 and 123 being connected by passages 125 and 126 to opposite ends of the main transmitter cylinder formed by the sleeve 92. A pipe 127 connected to the ports 108 and 122 leads to a liquid pressure accumulator (not shown), and a pipe 128 connected to the ports 110 and 124 leads to a liquid reservoir, also not shown, the liquid pressure and accumulator being coupled up with a pump and cut-out valve as shown in Figure 1.

The connections between the transmitter and motor units are as follows, the left and right hand ends of the various parts being as shown on the drawings. The left hand end of the transmitter cylinder (the sleeve 92) is connected to the left hand end of the motor cylinder 97 by the passage 125, an annular groove 129 around the sleeve 130 of the piston valve 103, and a pipe 131. The right hand end of the transmitter cylinder is connected to the right hand end of the motor cylinder 97 by the passage 126, a branch passage 132 and a pipe 133. The left hand end of the hollow transmitter piston 93 is connected to the left hand end of the hollow motor piston 98 by way of the port 119, groove 117, port 115, groove 113, passage 111, an annular groove 134 around the sleeve 135 of the piston valve 102, a pipe 136, a port 137 in the wall of the motor cylinder 97, a longitudinal groove 138 in the outer surface of the hollow motor piston 98, and a port 139 in the wall of that piston. The right hand end of the hollow transmitter piston is connected to the right hand end of the hollow motor piston by the port 120, groove 118, port 116, groove 114, passage 112, a branch passage 140, a pipe 141, a port 142 in the wall of the motor cylinder 97, a longitudinal groove 143 in the outer surface of the hollow motor piston 98, and a port 144 in the wall of that piston. The valve 103 is operated by an arm 145 carried by the tubular piston rod 95 and apertured to slide between stops 150 and 151 on the rod 152 which carries the valve 103 so that the valve piston 103 is moved to connect one or other end of the transmitter cylinder (the sleeve 92) to the liquid pressure accumulator and the other end thereof to the reservoir, whenever the hollow piston 93 reaches either end of its stroke. The valve 102 is operated by a bent arm 149 carried by the piston rod 96 and apertured to slide between stops 146 and 147 on the valve rod 148 which carries the valve 102, the stops being so spaced that the valve is operated only when both the hollow piston 93 and the inner piston 94 are at the same end of their strokes. Rotation of the hollow pistons 93 and 98 is prevented, in order to keep the grooves in the said pistons in register with the ports in the transmitter and receiver cylinders, rotation of the hollow transmitter piston being prevented by the valve operating arm 145, and rotation of the hollow receiver piston 98 being prevented by an arm 153 having an aperture through which passes a rod 154 fixed to the cylinder 97.

Each individual system of the dual system shown in Figure 3 operates in exactly the same manner as the system shown in Figure 1, except that the system comprising the inner pistons 94, 99 and the cylinders formed within the hollow pistons 93 and 98 (which may be termed the inner system) is connected to the accumulator and reservoir only when the hollow transmitter piston 93 as well as the inner piston 94 is at the end of its stroke, both pistons being at the same end of their strokes. It will be evident that this modification must be made to avoid connection of the inner system with the accumulator and reservoir when the piston 94 is not at the end of its stroke.

In the drawings, the hollow piston 93 is shown at the right-hand end of its stroke, the valve 103 having consequently been moved to connect the ports 122, 123 together, and to connect the ports 121 and 124 together, so that pressure from the accumulator acts upon the hollow motor piston 98 to ensure that the stroke of that piston is completed. The inner transmitter piston 94 and the inner motor piston 99 are between the ends of their strokes, and the valve 102 is, therefore, in its central position and the ports 107 and 109 are closed.

Figure 4:
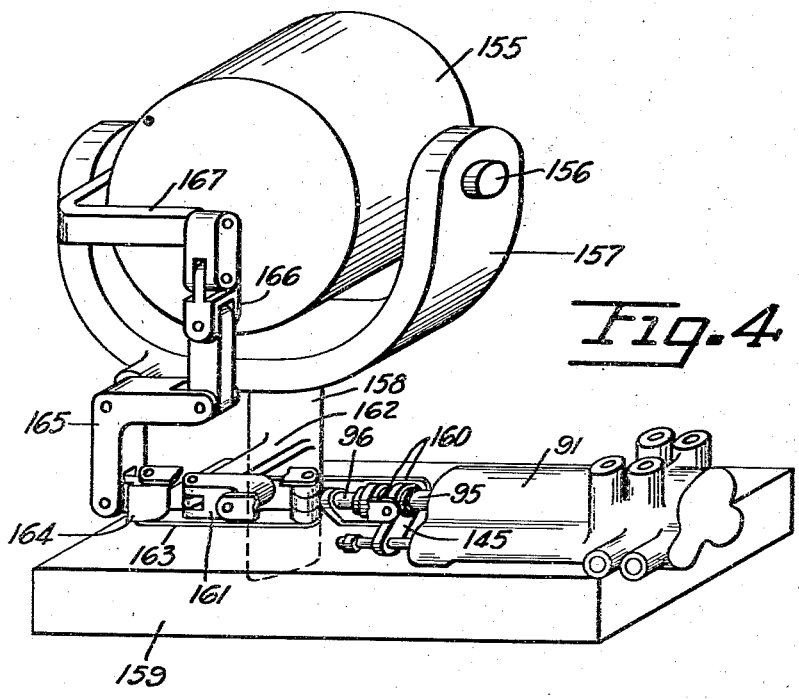
Figure 4 is an isometric view showing the transmitter unit of the system shown in Figure 3 coupled to one of two devices which are to be operated in synchronism.

Figure 4 shows a transmitter unit of the kind shown in Figure 3 coupled to a searchlight, to enable the movements of that searchlight to be duplicated by a second searchlight. No driving mechanism for effecting movement of the searchlight has been shown, as this may be of any known or convenient type and forms no part of the present invention.

The searchlight 155 is mounted on a horizontal pivot 156 in a U-shaped bracket 157 itself mounted on a vertical pillar 158 pivotally mounted in a base 159. The body 91 of the transmitter unit is rigidly secured to the base 159 by any convenient means. The hollow piston rod 95 carries, on the boss of the arm 145, horizontal pivot pins for a pair of links 160 pivotally connected at their other ends to a fork 161 itself pivoted, on a vertical axis, to an arm 162 projecting from the pillar 158. The inner piston rod 96 is similarly connected by a vertical pivot to links 163 connecting it to a member 164 connected by a horizontal pivot to one arm of a bell crank lever 165 mounted on the bracket 157. The other arm of the bell crank lever 165 is coupled by a universally jointed link 166 to an arm 167 secured to the searchlight 155. Movement of the searchlight about its vertical axis produces movement of both the hollow piston rod 95 and the inner piston rod 96, so that no relative movement of the two pistons takes place. Liquid is thus displaced by the hollow piston 93 (Figure 3) into the motor unit, but no liquid is displaced by the piston 94, and the second searchlight, which is connected to the motor unit by linkage similar to that just described, moves also about its vertical pivot. On the other hand, if the searchlight 155 is moved about the horizontal pivot 156 the inner piston rod 96 is displaced with relation to the hollow piston rod 95, and the inner piston 94 (Figure 3) of the transmitter unit displaces liquid to the interior of the hollow piston 98 of the motor unit, moving the piston 99 therein and producing corresponding movement of the second searchlight about its horizontal axis.

Figure 5:
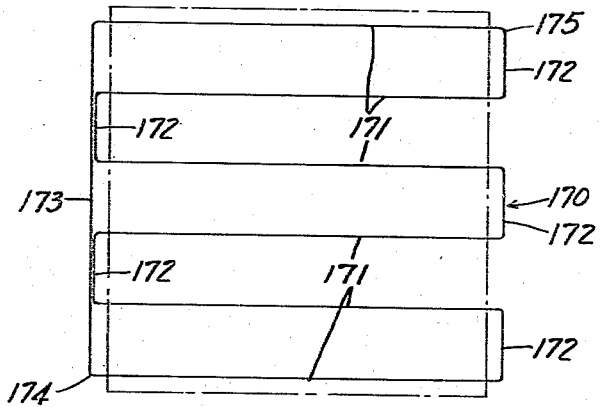
Figure 5 is a diagram relating to one method of employing the system shown in Figure 3.

The liquid pressure remote control system described with reference to Figure 3, coupled to searchlights in the manner described with reference to Figure 4, may with advantage be used to ensure the operation in unison of two searchlights which are required to scan a substantially rectangular area continuously. The searchlight to which the transmitter unit of the control system is coupled is driven in such a way that its beam is displaced along a path of the form indicated by the line 170 in Figure 5, the beam travelling to and fro on paths 171 displaced laterally one from another, and returning from the end of an extreme lateral path to the corresponding end of the other extreme lateral path. Each lateral path 171 corresponds to a complete stroke of the hollow pistons 93 and 98, and each short connecting path 172 corresponds to a partial stroke of the inner pistons 94 and 99, whilst the long connecting path 173 between the extreme lateral paths 171 corresponds to a complete stroke of the inner pistons 94 and 99. During a complete cycle of movement of the searchlights, the system comprising the main cylinders and the hollow pistons 93 and 98 is connected at each end to the accumulator as many times as there are lateral paths 171, and the inner system comprising the hollow pistons and inner pistons is connected at each end to the accumulator once only, at the points 174 and 175. Owing to the fact that the stroke of the transmitter pistons is slightly longer than that of the motor pistons, the connecting paths 172 of the searchlight connected to the motor unit will be slightly displaced inwardly from the corresponding paths of the searchlight connected to the transmitter unit, but within the area represented by the chain-dotted rectangle 176 the two searchlights will move in synchronism.

The transmitter unit shown in Figure 3 might be used with two separate motor units each corresponding to one part of the combined motor unit shown in the drawings. Although the source of pressure liquid has been described in all cases as an accumulator in which pressure is maintained by a pump, it may be a constant-pressure variable delivery pump, the delivery of which falls to zero when no liquid is being fed to the system.

The dual type of remote control system described may be applied to purposes other than that described herein. For example, it might be used to connect a weapon such as a machine gun or automatic cannon to a remote sighting device, the sighting device being moved by hand with or without servo-assistance, as desired over the field of fire which it covers, and the dual remote control system causing the gun to follow the sighting device. Re-phasing of both systems would then take place at the will of the operator, who, for that purpose, would move the sighting device to a position in which both transmitter pistons were at the same end of their stroke.

What I claim is:

1. A liquid pressure remote control system of the type described comprising a transmitter unit including a cylinder having a piston therein, a source of liquid under pressure, a motor unit including a cylinder having a piston therein, means connecting the transmitter unit to the motor unit, said connecting means and the transmitter and motor units forming a normally closed hydraulic system, manual means for operating said transmitter to put said closed hydraulic system under pressure, and a valve for controlling the liquid source to said transmitter and motor units, said valve being responsive to the movement of the transmitter piston to at least one end of the transmitter cylinder to cause said valve to open to connect that end of the transmitter cylinder to said pressure source, whereby the stroke of the motor piston if not completed by the movement of the transmitter piston is completed by liquid pressure from said source.

2. A liquid pressure remote control system of the type described comprising a transmitter cylinder, a motor cylinder, pistons in said cylinders, two conduits, one conduit connecting one end of the transmitter cylinder to one end of the motor cylinder and the other conduit connecting the other end of the transmitter cylinder to the other end of the motor cylinder and which together form a closed hydraulic system, means for producing movement of the transmitter piston in the transmitter cylinder, a source of liquid under pressure, and a valve device operated by the movement producing means when the transmitter piston reaches at least one end of its stroke, to connect the motor cylinder to said source of liquid pressure to cause the motor piston to tend to move in the same direction as it has been moved by the liquid from the transmitter cylinder during the stroke of the transmitter piston just completed.

3. A double acting liquid pressure remote control system of the type described comprising a transmitter cylinder, a motor cylinder, pistons in the cylinders, two pipe-lines, one line connecting one end of the transmitter cylinder to one end of the motor cylinder and the other line connecting the other end of the transmitter cylinder to the other end of the motor cylinder, a reservoir, a source of liquid under pressure, and a valve to be actuated by movement of the transmitter piston to either end of the transmitter cylinder, to connect that end of the transmitter cylinder to which the piston is moved to the liquid pressure source and to connect the other end to the reservoir, whereby the liquid from the source tends to move the motor piston in the same direction as it has been moved by the transmitter piston during its stroke just completed.

4. A double acting liquid pressure remote control system of the type described comprising a transmitter cylinder, a motor cylinder, pistons in the cylinders, two pipe-lines, one line connecting one end of the transmitter cylinder to one end of the motor cylinder and the other line connecting the other end of the transmitter cylinder to the other end of the motor cylinder, a reservoir having a connection to the transmitter cylinder, a source of liquid under pressure having a connection to the transmitter cylinder, liquid in the two pipe lines and in the ends of the cylinders, and valve means to be actuated by movement of the transmitter piston to either end of the transmitter cylinder, to connect that end of the transmitter cylinder to which the piston is moved to the liquid pressure source and to connect the other end to the reservoir, whereby the liquid from the source tends to move the motor piston in the same direction as it has been moved by the liquid from the transmitter cylinder during the stroke of the transmitter piston just completed, the effective area of each end of the transmitter piston is equal to the effective area of that end of the motor piston upon which liquid ejected from the transmitter cylinder by that end of the transmitter piston acts, the total stroke of the transmitter piston being greater than the stroke of the motor piston, the stroke of the motor piston being equal to that part of the stroke of the transmitter piston during which neither end of the transmitter cylinder is connected to the source of liquid under pressure.

5. A double acting liquid pressure remote control system of the type described comprising a transmitter cylinder, a motor cylinder, pistons in the cylinders, two pipe-lines, one line connecting one end of the transmitter cylinder to one end of the motor cylinder and the other line connecting the other end of the transmitter cylinder to the other end of the motor cylinder, a reservoir having a connection to the transmitter cylinder, a source of liquid under pressure having a connection to the transmitter cylinder, liquid in the two pipe lines and in the ends of the cylinders, and valve means to be actuated by movement of the transmitter piston to either end of the transmitter cylinder, to connect that end of the transmitter cylinder to which the piston is moved to the liquid pressure source and to connect the other end to the reservoir, whereby the liquid from the source tends to move the motor piston in the same direction as it has been moved by the liquid from the transmitter cylinder during the stroke of the transmitter piston just completed, said valve means controlling the connection of both ends of the transmitter cylinder to the source of liquid under pressure, and to the reservoir.

6. A double acting liquid pressure remote control system of the type described comprising a transmitter cylinder, a motor cylinder, pistons in the cylinders, two pipe-lines, one line connecting one end of the transmitter cylinder to one end of the motor cylinder and the other line connecting the other end of the transmitter cylinder to the other end of the motor cylinder, a reservoir having a connection to the transmitter cylinder, a source of liquid under pressure having a connection to the transmitter cylinder, liquid in the two pipe lines and in the ends of the cylinders, valve means to be actuated by movement of the transmitter piston to either end of the transmitter cylinder, to connect that end of the transmitter cylinder to which the piston is moved to the liquid pressure source and to connect the other end to the reservoir, whereby the liquid from the source tends to move the motor piston in the same direction as it has been moved by the liquid from the transmitter cylinder during the stroke of the transmitter piston just completed, said valve means controlling the connection of both ends of the transmitter cylinder to the source of liquid under pressure, and to the reservoir, the valve being normally biased to an intermediate position in which both ends of the transmitter cylinder are disconnected both from the source and the reservoir, a pair of stops secured to the valve means, and an arm carried by the transmitter piston for engaging said stops to move the valve in either direction from its intermediate position to connect one or the other ends of the transmitter cylinder to the source or the reservoir.

7. A double acting liquid pressure remote control system of the type described comprising a transmitter cylinder, a motor cylinder, pistons in the cylinders, two pipe-lines, one line connecting one end of the transmitter cylinder to one end of the motor cylinder, and the other line connecting the other end of the transmitter cylinder to the other end of the motor cylinder, a reservoir having a connection to the transmitter cylinder, a source of liquid under pressure having a connection to the transmitter cylinder, liquid in the two pipe lines and in the ends of the cylinders, a single piston valve including an operating rod to be actuated by movement of the transmitter piston to either end of the transmitter cylinder, to connect that end of the transmitter cylinder to which the piston is moved to the liquid pressure source and to connect the other end to the reservoir, whereby the liquid from the source tends to move the motor piston in the same direction as it has been moved by the liquid from the transmitter cylinder during the stroke of the transmitter piston just completed, said valve controlling the connection of both ends of the transmitter cylinder to the source, and to the reservoir, a spring normally biasing said valve to an intermediate position in which both ends of the transmitter cylinder are disconnected both from the source and the reservoir, a pair of stops on the operating rod, an arm carried by the transmitter piston for engaging said stops to move the valve in either direction from its intermediate position, a second pair of stops on the operating rod, a third pair of stops radially displaced with respect to said second stops and having the same spacing axially between them as the second stops, and a pair of washers slidable on the operating rod, said washers being engageable both with the second and third stops, said spring having its ends abutting the washers tending to urge the same against the second and third stops.

8. A liquid pressure remote control system of the type described comprising a transmitter cylinder, a motor cylinder, pistons in said cylinders, a conduit connecting one end of the transmitter cylinder to one end of the motor cylinder to form a normally closed hydraulic system through which force is transmitted to the piston in the motor cylinder for moving the motor piston in one direction, a spring for moving the motor piston in the opposite direction, a source of fluid under pressure, and a reservoir, valve means for connecting the liquid containing end of the cylinders to the source when the transmitter piston is at the end of its stroke during which it transfers liquid to the motor cylinder, and for connecting the said end of the cylinders to the reservoir when the transmitter piston is at the other end of its stroke, said valve means isolating the source of fluid under pressure and the reservoir from the normally closed hydraulic system at all other times.

9. A liquid pressure remote control system according to claim 8, wherein the valve means comprise a single piston valve, three ports axially spaced with respect to the piston valve which controls said ports, the two outer ports are connected respectively to the source of liquid under pressure and the reservoir, the intermediate port is connected to the liquid containing sides of the cylinders, said valve being normally biased to a central position in which it obturates the intermediate port, and being movable in either direction to connect the intermediate port to one or the other of the outer ports.

10. A liquid pressure remote control system of the type described comprising a transmitter unit including a cylinder, motor cylinders, an outer or hollow piston forming a second transmitter cylinder which is reciprocable in the first-named transmitter cylinder, an inner or second piston reciprocable in the second transmitter cylinder or hollow piston, pistons in the motor cylinders, conduits connecting the transmitter unit to the motor cylinders, the pistons in the motor cylinders being operated by the hollow piston and the second piston of the transmitter unit respectively, and means being provided to move the transmitter pistons together or separately to produce movement of one or the other of the motor pistons.

11. A liquid pressure remote control system according to claim 10, wherein one of the motor pistons is hollow to form a cylinder for the other motor piston.

12. A liquid pressure remote control system of the type described comprising a transmitter unit including a cylinder, motor cylinders, an outer or hollow piston forming a second transmitter cylinder which is reciprocable in the first-named transmitter cylinder, an inner or second piston reciprocable in the second transmitter cylinder or hollow piston, pistons in the motor cylinders, conduits connecting the transmitter unit to the motor cylinders, the pistons in the motor cylinders being operated by the hollow piston and the second piston of the transmitter unit respectively, and means being provided to move the transmitter pistons together or separately to produce movement of one or the other of the motor pistons, said motor pistons comprising an outer or hollow piston forming one of said motor cylinders and an inner or second piston reciprocable in said outer piston, a source of fluid under pressure, a reservoir, and a valve for each of the transmitter cylinders, one or the other of said valves to be actuated by movement of either of the transmitter pistons to either end of the cylinder in which it operates to connect that end of the said cylinder to the source of liquid under pressure, and to connect the other end of the said cylinder to the reservoir, whereby liquid from the pressure source tends to move the corresponding motor piston in the same direction as it has been moved by liquid from the transmitter cylinder during the stroke of the transmitter piston just completed.

13. A liquid pressure remote control system according to claim 12, wherein the valve controlling the connection of the transmitter cylinder, formed by the interior of the hollow piston, to the source of pressure and to the reservoir is operated to connect the ends of the said cylinder to the source and reservoir respectively only when both transmitter pistons are simultaneously at the same end of their strokes.

14. A liquid pressure remote control system of the type described comprising a transmitter unit including a cylinder, motor cylinders, an outer or hollow piston forming a second transmitter cylinder which is reciprocable in the first-named transmitter cylinder, an inner or second piston reciprocable in the second transmitter cylinder or hollow piston, pistons in the motor cylinders, conduits connecting the transmitter unit to the motor cylinders, the pistons in the motor cylinders being operated by the hollow piston and the second piston of the transmitter unit respectively, and means being provided to move the transmitter pistons together or separately to produce movement of one or the other of the motor pistons, said motor pistons comprising an outer or hollow piston forming one of said motor cylinders and an inner or second piston reciprocable in said outer piston, a source of fluid under pressure, a reservoir, a valve for each of the transmitter cylinders, one or the other of said valves to be actuated by movement of either of the transmitter pistons to either end of the cylinder in which it operates to connect that end of the said cylinder to the source of liquid under pressure, and to connect the other end of said cylinder to the reservoir, whereby liquid from the pressure source tends to move the corresponding motor piston in the same direction as it has been moved by liquid from the transmitter cylinder during the stroke of the transmitter piston just completed, each valve having a rod with stops thereon axially spaced, and an arm for each of the transmitter pistons and carried by the respective piston for engaging the stops of the appropriate valve when the piston approaches the end of its stroke, whereby said valve is operated.

15. A liquid pressure remote control system of the type described comprising a transmitter unit including a cylinder, motor cylinders, an outer or hollow piston forming a second transmitter cylinder which is reciprocable in the first-named transmitter cylinder, an inner or second piston reciprocable in the second transmitter cylinder or hollow piston, pistons in the motor cylinders, conduits connecting the transmitter unit to the motor cylinders, the pistons in the motor cylinders being operated by the hollow piston and the second piston of the transmitter unit respectively, and means being provided to move the transmitter pistons together or separately to produce movement of one or the other of the motor pistons, and connections to the interior of the hollow piston, said connections comprising longitudinal grooves in the exterior of the hollow piston and ports in the wall of the transmitter cylinder, and further ports in the piston connecting the grooves to opposite ends of the interior of said piston.

16. In combination a liquid pressure remote control system of the type described comprising a transmitter unit including a cylinder, motor cylinders, an outer or hollow piston forming a second transmitter cylinder which is reciprocable in the first-named transmitter cylinder, an inner or second piston reciprocable in the second transmitter cylinder or hollow piston, pistons in the motor cylinders, conduits connecting the transmitter unit to the motor cylinders, the pistons in the motor cylinders being operated by the hollow piston and the second piston of the transmitter unit respectively, and means being provided to move the transmitter pistons together or separately to produce movement of one or the other of the motor pistons, said motor pistons comprising an outer or hollow piston forming one of the motor cylinders and an inner or second piston reciprocable in said outer piston, hollow piston rods connected to the hollow pistons, inner piston rods connected to the inner pistons, bell-crank levers connected to the inner rods, a pair of devices each mounted for oscillatory movement in a selected plane, and a pair of supports on which the devices are mounted for oscillation, said supports being mounted for oscillation in a plane perpendicular to the first plane, the hollow piston rods being connected to the supports, and the inner piston rods being connected to the devices through the bell-crank levers.

JOHN KEITH SIMPSON.

Certificate of Correction

Patent No. 2,408,003.  September 24, 1946.

JOHN KEITH SIMPSON

It is hereby certified that errors appear in the printed specification of the above numbered patent requiring correction as follows: Column 4, line 32, after "piston" insert the numeral *29*; column 11, line 70, claim 8, for "and a reservoir, valve" read *a reservoir, and valve*; and that the said Letters Patent should be read with these corrections therein that the same may conform to the record of the case in the Patent Office.

Signed and sealed this 16th day of December, A. D. 1947.

[SEAL]

THOMAS F. MURPHY,
*Assistant Commissioner of Patents.*